United States Patent [19]
Julian

[11] Patent Number: 5,301,907
[45] Date of Patent: Apr. 12, 1994

[54] CABLE CLAMP

[75] Inventor: Kenneth A. Julian, Oak Brook, Ill.

[73] Assignee: Julian Electric Inc., Westmont, Ill.

[21] Appl. No.: 923,523

[22] Filed: Aug. 3, 1992

[51] Int. Cl.$^5$ .............................................. F16L 3/08
[52] U.S. Cl. .................................. 248/74.1; 174/135
[58] Field of Search ................... 248/74.1, 74.2, 74.4, 248/74.5, 73, 65; 174/135, 168

[56] References Cited

U.S. PATENT DOCUMENTS

| | | | |
|---|---|---|---|
| 2,553,883 | 5/1951 | Tinnerman | 248/74.3 |
| 3,244,803 | 4/1966 | Becker | 174/154 |
| 4,913,386 | 4/1990 | Sugiyama | 248/74.2 X |
| 5,009,376 | 4/1991 | Usui | 248/74.1 |
| 5,076,518 | 12/1991 | Washizu et al. | 248/68.1 |
| 5,118,916 | 6/1992 | Hucik | 248/74.1 X |

Primary Examiner—Ramon O. Ramirez
Attorney, Agent, or Firm—Patnaude, Videbeck & Marsh

[57] ABSTRACT

A cable clamp is provided for attaching a mid-portion of a cable having an electrically conductive interior surrounded by a non-conductive cover to a portion of a vehicle. The clamp includes a metal plate which is attachable to portions of a vehicle by a bolt extending through a transverse hole in the plate to secure the plate to the vehicle frame. A resilient elastomeric strap surrounds a portion of the length of the cable and surrounds the peripheral edges and a portion of the planar surface of the plate.

18 Claims, 2 Drawing Sheets

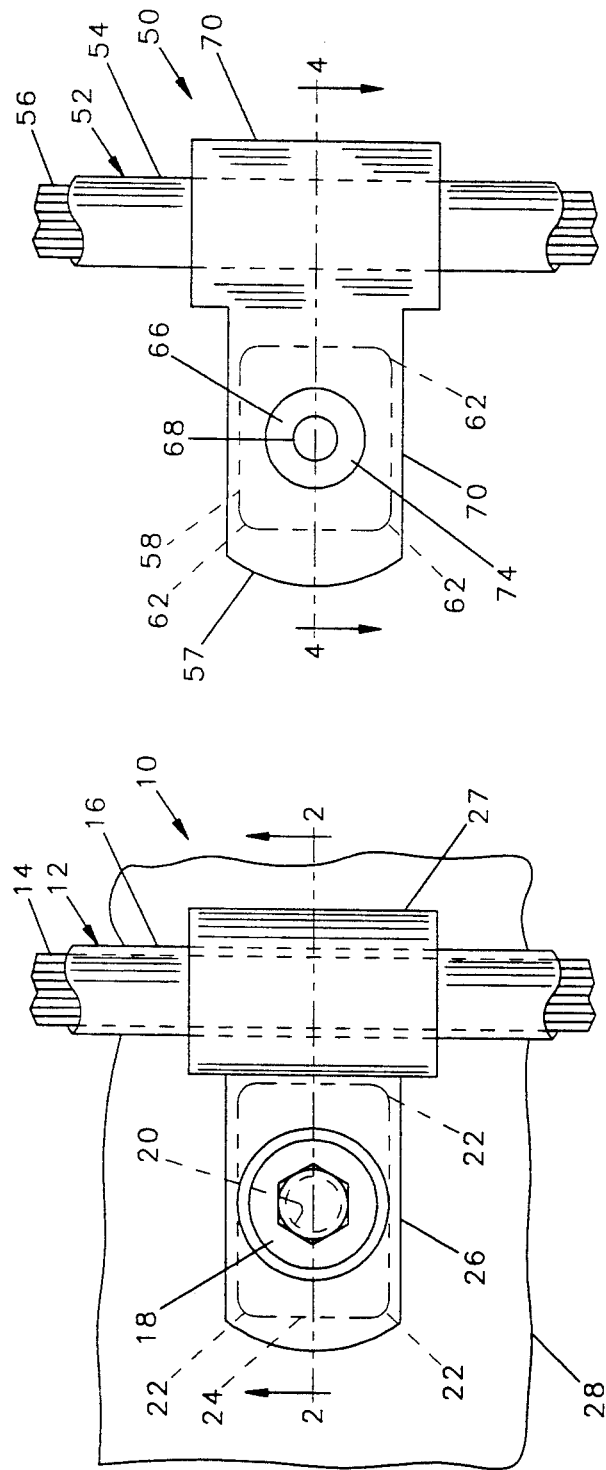

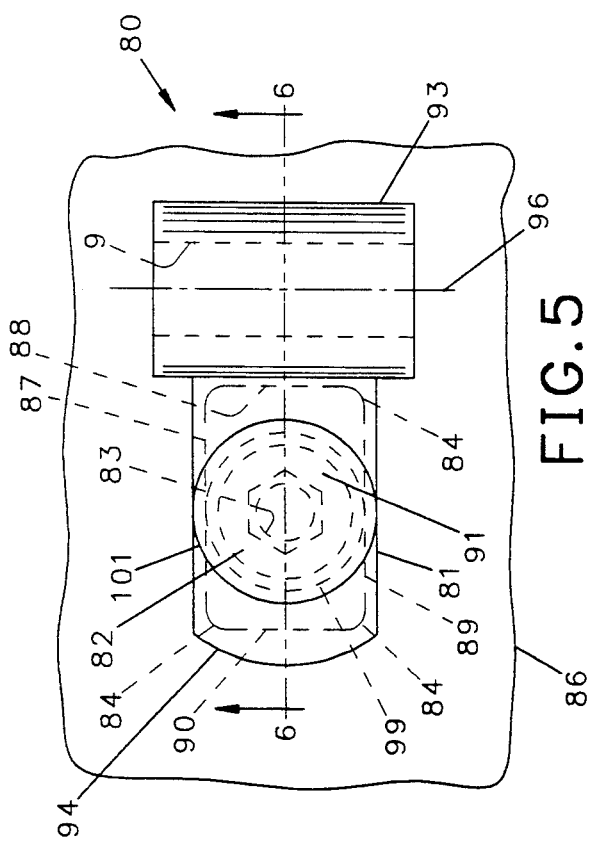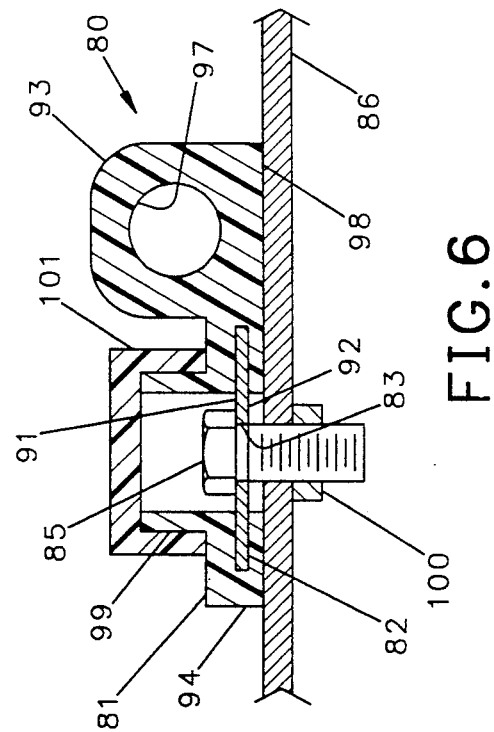

CABLE CLAMP

The present invention relates to a method and apparatus for clamping a cable consisting of stranded wires enclosed in a non-conductive elastomeric cover to a stationary object, and in particular to a cable clamp made of an elastomeric material for securing a cable connected to the battery of a vehicle.

BACKGROUND OF THE INVENTION

Motor vehicles, including trucks and the like, have a battery, and attaching the terminals thereof to the electrical components of the vehicle are cables which are made of stranded wires covered by an insulating material. Clamps are provided along the length of the cable to prevent movement of the cable relative to the frame of the vehicle which can occur from the vibration of the motor while it is running or from shock to the vehicle as it passes over rough terrain. Movement of the cable can cause it to come in contact with undesirable portions of the vehicle which are subject to intense heat, as for example exhaust ports, or portions having moving parts, as for example fan belts. Furthermore, movement of the cable can result in internal friction within the cable. Contact with undesirable portions of the vehicle, or internal friction in the cable can result in the ultimate failure of the cable.

Previously, such cables have been attached to portions of the frame of a vehicle by clamps consisting of a metallic strip a portion of which is wrapped around the circumference of the cable, and another portion of which extends perpendicularly away from the length of the cable and has a transverse hole therein such that the strip and therefore the cable may be attached to the frame of the vehicle by a bolt. Such clamps, however, over a long period of time, tend to cut through the elastomeric cover surrounding the cable as a result of the vibrations sustained within the engine compartment of a vehicle. The cable may also slip longitudinally within the metal strap, thereby causing wear and,,removal of the surface of the insulating cover surrounding the cable. As a result a short circuit may occur allowing current to flow from the stranded wires of the cable to the metal strap of the clamp, and then to the vehicle frame. Such a failure of the cable may result in the failure of the entire electrical system of the motor vehicle.

To reduce the cutting effect of the edges of a metallic strap, it has been the practice to enclose the metal strap in an elastomeric material. Nonetheless, it has been found that the edges of a metal strap can, over a period of time, cut through both the elastomeric material surrounding the strap, and the cover of an insulated cable, and result in the failure of the cable.

It is the object of the present invention to provide a cable clamp for attaching a mid-section of a cable to a portion of the frame of a vehicle, such as a bulkhead or the like, without providing for a strap of metal to surround the cable. Furthermore, it is an intent of the present invention to provide a cable clamp which will securely attach to the non-conductive cover surrounding the cable so as to prevent longitudinal movement of the cable relative to the clamp.

SUMMARY OF THE INVENTION

Briefly, there is provided in accordance with the present invention a new and improved cable clamp for attaching a mid-portion of a cable having an electrically conductive interior surrounded by a non-conductive cover to a stationary member. The invention includes a planar panel of rigid material, such as a metal plate, which is attachable to portions of the vehicle by any appropriate means, such as a transverse hole through the panel through which a bolt can be passed to secure the panel to the vehicle frame. The invention further includes a resilient elastomeric strap surrounding a portion of the length of the cable and surrounding the peripheral edges of the planar panel and a portion of the planar surfaces of the panel. In one embodiment of the present invention the elastomeric strap surrounding a portion of the length of the cable is bonded to the non-conductive covering of the cable to prevent longitudinal movement of the cable within the clamp. In another embodiment of the present invention, the elastomeric strap is molded to fit a cable of a given diameter and adapted to be slidably positioned along the length of a cable and thereafter secured in its desired position by the use of an adhesive.

Clamps as provided above may be molded and secured to the length of the cable at the time the cable is cut to length, and appropriate terminations attached to the ends thereof, or the clamps may be molded around a cylindrical member which can be removed leaving a bore through which a cable may be passed.

GENERAL DESCRIPTION OF THE DRAWINGS

Further objects and advantages and a better understanding of the present invention will be had by reference to the following detailed description taken in connection with the accompanying drawings wherein:

FIG. 1 is a top view of a cable having a clamp attached thereto in accordance with the present invention;

FIG. 2 is a cross-sectional view of the cable clamp of FIG. 1 taken through line 2—2 thereof;

FIG. 3 is a bottom view of a cable having a clamp attached thereto in accordance with another embodiment of the present invention;, FIG. 4 is a cross sectional view of the cable clamp of FIG. 3 taken through line 4—4 thereof.

FIG. 5 is a top view of a cable clamp in accordance with still another embodiment of the present invention; and FIG. 6 is a cross-sectional view of the cable clamp of FIG. 5 taken through line 6—6 thereof.

DETAILED DESCRIPTION OF A PREFERRED EMBODIMENT

Referring to FIGS. 1 and 2 in which a cable clamp 10 is attached to an electrical cable 12 consisting of stranded wires 16 surrounded by an insulating cover of elastomeric material 14. The cable clamp lo includes a planar panel of rigid material, such as a metal plate 18, having a centrally located transverse hole 20 therein.

The metal plate 18 is sufficiently thick to provide sufficient rigidity to retain the cable clamp to a portion of the frame of a vehicle, and is generally rectangular in shape but having substantially rounded corners 22. Molded over the peripheral edge 23 and a portion of the surfaces 24, 25 of the plate 18, thereby forming an attachment tab 26. Encircling a portion of the cable 12, is an elastomeric covering material 27 which leaves uncovered only the central portion of the metal plate 18 surrounding the transverse hole 20. The elastomeric cover 27 is of a suitable material such as a plastic, and the portions of the cover 27 surrounding the cable 12 and surrounding the metal plate 18 and adjoining portions surrounding the metal plate and the cable 12 are made with sufficient thickness and material bulk to retain the cable 12 in the desired location when the metal plate 18 is secured to the frame of a vehicle 28. The rounding of the corners 22 of the metal plate 18 will minimize the cutting effect of the corners 22 of the metal plate 18 into the cover 27.

The transverse hole 20 is adapted to receive a bolt which extends therethrough for attaching the metal plate 18 within the tab 26, and therefore the cable clamp 10 to a portion of the frame 28 of a vehicle.

The elastomeric cover 27 is contoured to provide a substantially planar surface 38 which is adapted to rest against a planar portion of a frame 28 of a vehicle when the metal plate 18 is secured to the vehicle by a bolt 39 which is passed through the transverse hole 20 and though a complementary hole in the frame of the vehicle 28 and retained in position by a nut 41. There is also provided a tubular section 40 surrounding the transverse hole 20 through the metal plate 18 and the tubular section 40 extends outwardly away from the side of the plate 18 which is not provided with the planar surface 38. The tubular section 40 may be adapted to retain a cap, not shown, which when fitted over the tubular section 40 protects the metal bolt 39 and the uncovered portions of the metal plate 18 from water or other corrosive materials which would deteriorate the bolt 39 and the metal plate 18.

The cable clamp lo in accordance with the present invention is best formed by first roughing the outer surfaces of the insulating cover 16 of the cable 12 in the area to which the cable clamp 10 is to be applied. Thereafter, the portions of the cable 12 to which the clamp 10 is to be applied, and a metal plate 18 having a transverse hole therein 20 are positioned in a suitable mold which retains the plate 18 in its desired location relative to the cable 12 by grasping the metal plate 18 adjacent the transverse hole 20. Thereafter, a suitable plastic or other elastomeric material is injected into the mold, compressed, and allowed to cool. A cable clamp 10 may thereby be molded to a portion of cable which is cut to the desired length for use in a vehicle. Clamps as described are particularly suitable for installation in new vehicles because the exact lengths of the cable and position of the clamp is known to the manufacturer.

An effort should be made to select an elastomeric material for the cover 27 which will bond against the etched surfaces of the insulating cover 16 of the cable 12. When the elastomeric material 27 of the cable clamp 10 is bonded to the cover 16 of the cable 12, the cable clamp 10 will not slide longitudinally along the length of the electrical cable 12.

Another embodiment of a cable clamp 50 is shown in FIGS. 3 and 4. In this embodiment, a cable clamp 50 is attached to a cable 52 having an elastomeric cover 54 surrounding stranded wires 56.

As in the first embodiment the clamp 50 has a tab 57 within which there is a substantially rectangular metal plate 58 having a transverse hole 60 and having rounded corners 62. In this embodiment, a threaded bolt 64 is passed through the hole 60 in the metal plate 58 and secured by a threaded nut 66 leaving a threaded stud 68 of the bolt 64 extending beyond the threaded nut 66.

As with the first embodiment, the edges of the metal plate 58 and are enclosed in a elastomeric cover 70, and a portion of the elastomeric cover 70 encircles a portion of the cable 54. The elastomeric Material 70 has sufficient thickness for the portion encircling the cable 54, the metal plate 58, and the junction between these two portions such that the cable 54 will be maintained in its desired Position relative to the metal plate 58 when the cable clamp 50 is attached to the frame of a vehicle, not shown. The elastomeric material 70 may further surround the entire head 72 of the bolt 64 and leave uncovered only the outer face 74 of the nut 66 and extending stud 68 such that the head 72 of the bolt 64 and the metal plate 58 will be protected against corrosive materials. A substantially planar surface 76 is provided perpendicular to the exposed stud 68 of the projecting threaded bolt 64 such that the planar surface 76 can rest against a portion of the frame of a vehicle. The threaded stud 68 of the bolt 64 is adapted to extend through a transverse hole in the frame of a vehicle, not shown, and be attached thereto by a nut on the opposing side thereof and thereby retain the cable connector 50 and the cable 52 against the frame of a vehicle.

Another embodiment of a cable clamp is shown in FIGS. 5 and 6 which is suitable for attaching a clamp to a cable in the field. In this embodiment a clamp 80 includes a substantially planar rectangular metal plate 82 with rounded corners 84 positioned within a tab portion 81. A centrally located transverse hole 83 extends through the metal plate 82 in the tab 81 is sufficiently large to receive the shaft of a bolt 85 for attaching the clamp 80 to the frame of a vehicle 86. Surrounding the outer edges 87, 88, 89, 90 of the plate 82, and covering a portion of the upper and lower surfaces 91, respectively, of the plate 82 and forming the tab 81, is a cover 94 of an elastomeric material such as a plastic, which leaves uncovered a portion of the plate 82 surrounding the centrally located hole 83.

A tubular section 93 of the elastomeric cover 94 which is integral with the elastomeric material surrounding the plate 82 is Positioned such that the axis 96 thereof is parallel to one edge 88 of the plate 82. The tubular section 93 has a central bore 97 which has a diameter a little larger than the diameter of the cable to which the clamp is to be attached, not shown, such that the clamp may encircle and slide along the length of the cable and thereafter be secured at the desired position along the length thereof with an appropriate adhesive material.

Parallel to the lower surface 92 of the plate 82, there is provided a substantially planar surface 98 of the elastomeric cover material 94 which is adapted to rest against a planar surface of the frame of a vehicle 86 when the clamp so is secured thereto by a bolt 85 passed through the hole 38 and into a complementary hole in the frame of the vehicle 86 and secured by a nut 100. Surrounding the centrally located hole 83 and extending perpendicularly away from the upper surface 91 of the plate 82 is a second tubular portion of elastomeric material 99, which is adapted to receive a cap 101 for covering the head of the bolt 85.

Although the clamp 80 portrayed in this embodiment is adapted to receive a bolt to attach the clamp to the frame of a vehicle the clamp could also be adapted to include a threaded stud for attachment to the frame of a vehicle similar to the stud 68 shown in the second embodiment 50.

There is, therefore, described above, a new and improved cable clamp for retaining an electrical cable against the frame of a vehicle which will retain the cable against longitudinal movement of the cable within the clamp, and further provide a cable clamp which will not cut into the insulating material surrounding the cable and cause the electrical failure of the cable during usage.

While a plurality of embodiments of the present invention have been disclosed, it will, be apparent to those skilled in the art that changes and modifications may be made within the spirit and scope of the invention. It is therefore the purpose of the appended claims to cover all changes and modifications which fall within the true spirit and scope of the invention.

What is claimed:

1. A cable clamp for attaching a cable having an electrically conductive interior surrounded by a non-conductive cover to a mounting member comprising in combination:
   tab of elastomeric material,
   means for attaching said tab to said mounting member,
   a portion of said elastomeric material attached to said tab forming a cylindrical strap adapted to encircle a portion of the length of a cable.

2. A cable clamp in accordance with claim 1 wherein said elastomeric strap is bonded to said non-conductive cover of said cable.

3. A cable clamp in accordance with claim 1 wherein said means for attaching said tab to said mounting member is a transverse hole through said tab.

4. A cable clamp for attaching a cable having an electrically conductive interior surrounded by a non-conductive cover to a mounting member comprising in combination:
   a tab of elastomeric material,
   a rigid planar panel for attaching said tab to said mounting member, and
   a portion of said elastomeric material attached to said tab forming a cylindrical strap encircling a portion of the length of a cable.

5. A cable clamp for attaching a cable having an electrically conductive interior surrounded by a non-conductive cover to a mounting member comprising in combination:
   a tab of elastomeric material,
   a threaded stud attached to a planar panel within said tab, said threaded stud extending perpendicularly to the plane of said planar panel for attaching said tab to said mounting member, and
   a portion of said elastomeric material attached to said tab forming a cylindrical strap encircling a portion of the length of a cable.

6. A cable clamp in accordance with claim 5 wherein said stud is the threaded end of a bolt which has been passed through a transverse hole in said planar panel.

7. A cable clamp in accordance with claim 6 wherein said planar panel is metallic.

8. A cable clamp for attaching a cable having an electrically conductive interior surrounded by a non-conductive cover to a mounting member comprising in combination:
   a tab of elastomeric material,
   a transverse hole through said tab for attaching said tab to said mounting member,
   a portion of said elastomeric material attached to said tab forming a cylindrical strap for encircling a portion of the length of a cable, and
   a planar metallic panel embedded in said tab.

9. The combination comprising:
   a cable having an electrically conductive interior surrounded by a non-conductive cover,
   a planar panel of rigid material having a peripheral edge,
   means for attaching said planar panel to a mounting member, and
   a resilient elastomeric enclosure encircling a portion of said cable and surrounding said peripheral edge of said planar panel.

10. The combination in accordance with claim 9 wherein said elastomeric strap is bonded to said non-conductive cover of said cable.

11. The combination in accordance with claim 9 wherein said means for attaching said planar panel to said mounting member is a transverse hole through said planar panel whereby said planar panel may be attached to said stationary member by a bolt.

12. The combination in accordance with claim 9 wherein said means for attaching said planar panel to said mounting member comprises a transverse hole through said planar panel and a threaded bolt passed through said transverse hole.

13. The combination in accordance with claim 12 wherein said bolt is retained in said transverse hole by a nut.

14. The combination in accordance with claim 11 wherein said planar panel is metallic.

15. The combination in accordance with the claim 13 wherein said planar panel is metallic.

16. The combination comprising:
   a cable having an electrically conductive interior and surrounded by a non-conductive cover,
   a planar panel of rigid material having a peripheral edge,
   a bolt extending through a transverse hole in said planar panel attaching said planar panel to the frame of a vehicle, and
   a resilient elastomeric enclosure encircling a portion of said cable and surrounding said peripheral edge of said planar panel.

17. A method of attaching a clamp to a cable of stranded wires surrounded by a cover comprising the steps of:
   positioning an intermediate portion of said cable in a mold,
   positioning a planar panel of rigid material in said mold, said planar panel having a transverse hole therein and a peripheral edge,
   injecting an elastomeric material into said mold to mold said elastomeric material around a portion of said cable and said peripheral edge of said planar panel.

18. The method of attaching a clamp in accordance with claim 17 further comprising the step of:
   roughing the surface of said cover of said cable prior to positioning an intermediate portion of said cable in said mold.

* * * * *